United States Patent Office 3,108,084
Patented Oct. 22, 1963

3,108,084
BLOCKED AROMATIC DIISOCYANATE
CURING AGENTS
Lynwood N. Whitehill, Homewood, Ill., and Austin C.
Abbott, Jr., Hammond, Ind., assignors to The Sherwin-
Williams Company, Cleveland, Ohio, a corporation of
Ohio
No Drawing. Filed Jan. 6, 1958, Ser. No. 707,117
9 Claims. (Cl. 260—22)

This invention relates to a completely blocked monomeric composition containing in its chemical structure two urethane residues or groups having a latent reactivity equivalent to a single mole of an aromatic diisocyanate.

More particularly this invention relates to a monomeric condensation product of one mole of a bis-aryl compound containing two labile hydrogen groups, two moles of a tertiary alkyl alcohol and two moles of a 2–4 substituted aromatic diisocyanate.

It is well known in the art that polyisocyanates are extremely reactive with labile hydrogen groups or compounds containing labile hydrogen groups. Because of this, polyisocyanates are useful in cross-linking polymeric chains of linear polyesters, polyester amides and other polymeric materials containing labile or reactive hydrogen atoms as are used in forming protective coatings over substrates.

However, it is known that the diisocyanates, per se, are both relatively toxic and relatively volatile so that not only is there danger in the described use from the standpoint of toxicity, but also in efficiency in their use because of the volatility of the diisocyanates when subjected to higher temperatures, as is customary in the curing of the class of polymeric materials described for the purpose of forming a solid film as a protective and decorative coating over a variety of substrates. Not only is there the dual problem of toxicity and volatility in the use of isocyanates as curing agent in conjunction with labile hydrogen containing film forming polymers, but there is also a problem of reactivity when intimately admixed with polymeric materials having active or labile hydrogen groups in the polymer molecule. Up until very recently, the excess reactivity of polyisocyanate monomers has made it mandatory to package the cross-linking or curing polyisocyanate monomer in a package separate and distinct from the container employed for transportation of the protective and decorative polymeric coating to the time and place of its ultimate use. Double compartment containers and dual package arrangements are at best a source of aggravation in use, error in mixing and uncontrolled cure in the final film due to the vagaries of the many persons involved before final application and cure of the polyisocyanate-polymeric coatings.

The broad object of this invention is to provide an aromatic diisocyanate complex of such nature that it may be included in intimate admixture under normal temperature conditions with polymeric film forming coatings containing active or labile hydrogen groups so that such combined coatings may be stored in intimate admixture (of the blocked isocyanate cure agent-polymeric compound) for extended periods of time without reactivity.

It is a further broad object of this invention to provide a polyurethane radical containing monomeric complex which may be stored in combination with polymeric materials ordinarily reactive therewith but which will, when laid down in combination in said films of the thickness customarily employed in the protective and decorative coatings art, cause the film to cure at a temperature of the order of 250° F., when held for a minimum time of about one half hour.

It is also a broad object of the invention to provide a novel composition containing latently reactive urethane groups which do not break down under baking temperatures and times to liberate toxic components from the film during curing.

The foregoing and other objects of this invention will become apparent as the description of the invention is developed in the following exposition.

The compositions of this invention may be referred to generally as monomers for while five molecules are structurally represented in the composition of the class of new chemical compounds serving to provide the objects hereinbefore set out, none are repeating units as in polymers.

One of the basic components of the complex monomers of this invention is illustrated by the following general structure:

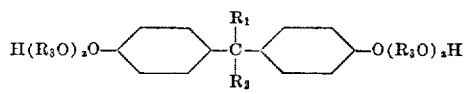

where $R_1$ and $R_2$ are selected from the group consisting of hydrogen and alkyl groups, $R_3$ is an alkylene group containing from two to three carbon atoms in the alkylene group, and $z$ is a digit or symbol from zero to four.

It is also well known to produce nuclei similar to the nucleus of p-p' dihydroxyl diphenyl propane by substituting in the above general structure for $R_1$ and $R_2$ substituent radicals selected from the group consisting of hydrogen and alkyl groups. In general, this central grouping is an alkane containing less than four carbon atoms. In respect to the present invention it is only essential that the aromatic nucleus of the parent reactive bis-aryl compound contain two aromatic groups in bis relationship having a reactive general structure of the class illustrated.

The second reactant essential to form the monomeric polyurethanes or cure agents of this invention is an aromatic diisocyanate wherein the isocyanate groups are preferably in the 2,4, relationship to one another as substituents in the aromatic ring. The aromatic ring may be substituted in the 1 position with halogen or an alkyl substituent. It is preferred that no substituents other than those named be associated with the aromatic nucleus. Among the aromatic diisocyanates, the preferred one is 2,4-toluene diisocyanate.

The structure of the aromatic diisocyanates and their useful homologues and isologues may be illustrated generically as follows:

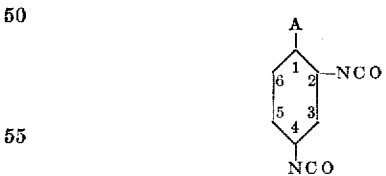

where A is a hydrogen, halogen or an alkyl group, and the NCO groups are in the 2 and 4 positions of the phenyl nucleus as shown.

The third essential monomer which reacts to produce the curing agents of this invention is a tertiary aliphatic alcohol. We prefer to use tertiary butyl alcohol although tertiary amyl alcohol may also be used for the purposes of the invention. Thus, the preferred aliphatic tertiary alcohols must contain at least four carbon atoms obviously essential to provide a tertiary structure; tertiary butyl alcohol being the first possible member of the series and tertiary amyl alcohol the second member of the tertiary alcohol series.

The complex monomers formed in reaction of the above reactants and the products of this invention are represented in generic form by the following graphic structure:

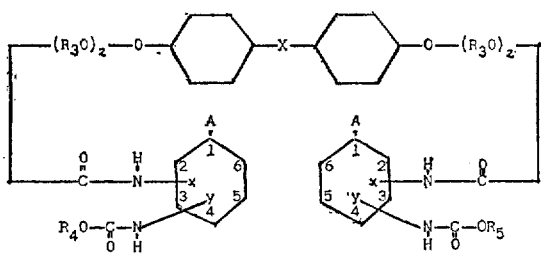

where "$x$" and "$y$" are ring substituent bond positions corresponding to the 2 position and the 4 position of the phenyl nucleus, A is a group selected from the class consisting of halogen and lower alkyl and $R_4$ and $R_5$ are tertiary aliphatic alcohol residues containing from 4 to 5 carbon atoms and X is an alkylene radical containing 2 to 3 carbon atoms, the sole reactive positions of the compound thereof being para, para' (p-p').

Illustrative of preferred monomeric compounds of this invention containing two urethane groups are those of the following general structure:

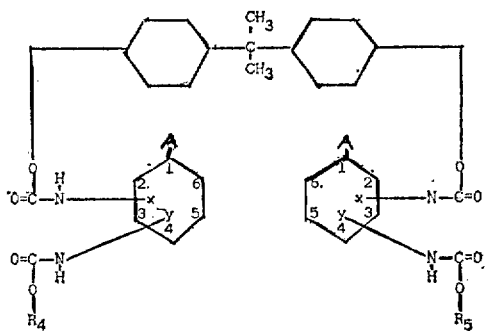

where "$x$" and "$y$" are ring substituent bond positions corresponding to the 2 position and the 4 position of the phenyl nucleus, A is a group selected from the class consisting of halogen and lower alkyl and $R_4$ and $R_5$ are tertiary aliphatic alcohol residues containing from 4 to 5 carbon atoms.

Two methods for the preparation of useful curing agents of the above structure are possible and the difference in the methods give rise to slightly varying structural relationships in the final composition without essential change in ultimate usefulness. In one convenient method of preparation, the tertiary alcohol is reacted with the aromatic diisocyanate as a first step. In this instance the alcohol preferentially reacts with the isocyanate group in the four position. Following this method through, two moles of aromatic diisocyanate are reacted with two moles of the alcohol in the presence of an inert solvent and an inert gas. (The precaution should be taken to dry out the reaction vessel and the reactants to eliminate all water which may be present in the reaction zone.)

The alcohol component is slowly added over a time period to the isocyanate in the reaction vessel. After the addition has been completed the temperature is maintained at about 120° F. or within a range of 80 to 180° F. After a holding period of approximately 20 to 30 minutes, one mol quantity of the difunctional bis-aryl compound containing two active or labile hydrogen atoms is added to the isocyanate-tertiary alcohol condensation. Addition is best accomplished by first dissolving the difunctional dihydroxy bis-aryl compound in an inert solvent, for example, butyl acetate, in approximately 1–1 weight ratio and adding the solution slowly over a time period. During addition, the reaction is somewhat exothermic and is preferably not allowed to exceed 150° to 175° F. Temperature control is obtained by external cooling or heating, as necessary, of the reaction vessel. After all of the ingredients have been combined and the exothermic reaction brought under control, the temperature of the reaction mass is held within a range of 125 to 175° F. for one hour more or less. Thereafter additional butyl acetate may be added, the reactants heated to 200° F., to tie in any reactive isocyanate groups, thus enhancing stability. The product is cooled rapidly from 200° F. to room temperature. It may then be intermixed with the defined class of polymeric materials for later use.

The second method of preparation is quite similar to the first with the change that two moles of the aromatic diisocyanate are first reacted with one mol quantity of the p-p' dihydroxy (alkoxy) bis-aryl compound. In this case the isocyanate group in the four position first reacts with the labile hydrogen atoms of the dihydroxy diaryl alkane.

After this first stage of the reaction is completed, the condensation product is further reacted with two molar equivalents of the selected tertiary aliphatic alcohol, in much the same manner as described in the alternate, or first, procedure described above.

Description of the method of preparation of the compounds of this invention is set out in a general way and in the specific examples which follow and are illustrative but not exhaustive. The examples are included for purposes of example but not as limitation upon or to the specific species illustrated thereby. It is obvious from the foregoing description of the objects of the invention and the description of components suitable for the practice of this invention that a relatively broad range of compounds are substantially equivalent for the purposes of this invention.

The following examples are illustrative of the manufacture of preferred compositions:

*Example 1*

A reaction vessel is equipped with an agitator, addition funnel, thermometer, water cooled condenser, inert gas inlet and a means for controlling the heat input into the vessel.

50 parts of dichlorobenzene and 174.2 parts of 2,4-toluene diisocyanate are weighed into the reaction vessel. After starting the agitator and inflow of inert gas, 81.4 parts of tertiary butyl alcohol are added to the previous solution over a 20 minute period. After all the alcohol has been added, agitation is continued for another 20 minutes, holding the temperature of the reactants in a range from 80 to 150° F. At the end of this period, slow addition of a solution containing 114.1 parts of p-p' dihydroxy diphenyl propane dissolved in 125 parts of butyl acetate is started in, in increments, through the addition funnel into the reaction mass over a 50 minute period. The reaction which occurs is exothermic and is not allowed to exceed about 150° F. After all the dihydroxy diphenyl propane solution has been added, the reaction mass is held at 150° F. for an additional hour. 65 parts of butyl acetate are added and heating continued upward to 200° F. Upon reaching 200° F., the reaction mass is removed from the source of heat, cooled rapidly and held for later use.

*Example 2*

A reaction vessel as described in Example 1 is employed. 174.2 parts of 2,4 toluene diisocyanate and 75 parts of dichlorobenzene are weighed into the reaction vessel. An inert gas atmosphere is maintained over the reactants and agitation started. In this example, the p-p' dihydroxy diphenyl propane is dissolved in xylene to approximately 50% concentration and added in increments over a 20 to 60 minute period during which time 114 parts of p-p' dihydroxy diphenyl propane are incorporated in the reaction mass. The temperature of the reaction is not allowed to exceed 200° F. and this temperature level is maintained for 30 minutes after the addition of the diol is complete. The reaction mass is cooled to 100° F. and one part of a 2% solution of a cobalt naphthenate and mineral spirits added. 81½ parts of tertiary butyl alcohol in solution in xylene is added to the reaction mass over a 20 to 40 minute period. Again, the temperature is not permitted to exceed 150° F. After all of the alcohol has been incorporated, the temperature of the reaction mass is held at 150° F. for one hour. The reactant temperature is increased to 200° F., and upon reaching this degree of heat, cooled rapidly back to room temperature. Butyl acetate or other suitable solvents including toluene, benzene, dichlorobenzene, cyclohexanone, methyl ethyl ketone, methyl isobutyl ketone, aromatic naphthas, etc., may be added to the solution if desired.

Example 3

In the reactor as described in Example 1 are weighed 348½ parts of 2,4 toluene diisocyanate, 100 parts of ortho dichlorobenzene and inert gas brought over the contents of the vessel. Agitation is started and a solution containing one part of a 2% solution of cobalt naphthenate in mineral spirits, 163 parts of tertiary butyl alcohol and 50 parts of toluene is added over a 20 minute period. The temperature is maintained at 100° F. for 20 minutes whereupon 228.2 parts of p-p' dihydroxy diethoxy diphenyl propane dissolved in 250 parts of ortho dichlorobenzene are added slowly to the reaction mass over a 50 minute interval. The exothermic reaction is allowed to carry the temperature to 150° F. at which point it is controlled and held for about one hour.

Example 4

The same as in Example 3, wherein calcium octoate is used as a catalyst in the reaction mass.

Example 5

Into the reaction vessel as described in Example 1 are weighed 195 parts of 1-chloro 2,4-phenyl diisocyanate and 75 parts of ortho dichlorobenzene. While maintaining an inert gas atmosphere over the mass in the vessel, a solution containing 96 parts of tertiary amyl alcohol, .4 of a milliliter of a 6% solution of calcium octoate in mineral spirits and 15 parts of butyl acetate is added in increments to the diisocyanate solution. The temperature of the reaction mass is maintained at 100° F. with agitation for about 20 minutes. Thereafter 100 parts of p-p' dihydroxy diphenyl methane dissolved in 120 parts of butyl acetate is added to the reaction mass over a 60 minute period not allowing the batch temperature to exceed 175° F. during the addition. After all the solution has been added the temperature is again held at 150° F. for one hour, the heat increased momentarily to 200° F., cooled rapidly and reduced with butyl acetate for convenience in handling.

Example 6

In a reactor similar to that described above, 348.4 parts of toluene diisocyanate and 100 parts of xylene are weighed in and an inert gas atmosphere maintained over the reaction zone. 345 parts of bis(hydroxy iso-propoxy phenyl) dimethyl methane and 100 parts of butyl acetate are added to the materials in the reaction flask over a 30 minute period, not allowing the temperature to exceed 200° F. A temperature of 175° F. is maintained for 30 minutes after the addition has been completed. The temperature is cooled to 100° F. and 170 parts of tertiary butyl alcohol and 85 parts of butyl acetate is added to the reaction mass over a 40 mintue period not allowing the temperature to exceed 150° F. The temperature is held at 150° F. for an additional hour after all addition has been completed. The temperature of the reaction mass is then increased to 200° F. momentarily and cooled back rapidly to room temperature.

Example 7

In equipment similar to Example 1, and following the procedure therein set out, a product is made substituting 42.7 parts by weight of 1,2,6-hexane triol for the 114.1 parts by weight of the aromatic p-p' dihydroxy diphenyl propane. Manufacturing steps are comparable to those described in Example 1.

Example 8

Into a reactor similar to that described above, 348.4 parts of 2,4-toluene diisocyanate and 100 parts of distilled low alcohol content butyl acetate are weighed. An inert atmosphere is maintained in the reaction vessel. 163 parts of tertiary butyl alcohol is introduced over a 15–25 minute period after which 1 part of a 2% solution of cobalt naphthenate in mineral spirits is added and heat is applied to aid in starting the exothermic reaction. The exotherm is allowed to subside after which the temperature is brought to 140° F. (±10° F.). The addition of 344.2 parts of bis(hydroxy propoxy phenyl) dimethyl methane dissolved in 192.1 g. of low alcohol butyl acetate is made over a 45 minute period. During this addition the temperature of the reaction mass is controlled at 150° F. After the addition of the bis(hydroxy propoxy phenyl) dimethyl methane is completed the reaction mass is held at 150° F. for one hour. The temperature is then raised to 200° F. and upon reaching this temperature the mass is cooled rapidly to at least 110° F.

This product was used in minor quantity in conjunction with a polyester resin to cause a more rapid and complete cure of the polyester film upon baking at 250° F.

Example 9

Into a reactor similar to that described above 348.4 parts of 2,4-toluene diisocyanate and 40 parts of distilled low alcohol butyl acetate are weighed. An inert atmosphere is maintained in the reaction vessel. 163 parts of tertiary butyl alcohol is introduced over a 15 to 25 minute period followed by ½ part of a 6% solution of cobalt octoate in mineral spirits. Heat is applied to start the exothermic reaction and the reaction is allowed to reach its peak and subside without external cooling. The temperature is brought to 140° F. and the addition of 316 parts of bis(hydroxy ethoxy phenyl) dimethyl methane, dissolved in 360 parts of distilled toluene, is made over a 45 to 75 minute period. The temperature of the reaction mass is controlled at 150° F. during this addition. After the addition of the bis(hydroxy ethoxy phenyl) dimethyl methane is completed the reaction mass is held at 150° F. for one hour. The temperature is then raised to 200° F. and upon reaching this temperature is cooled rapidly to at least 110° F.

Example 10

The same as Example 9 with the substitution of 370 parts of bis(hydroxy dichloro phenyl) dimethyl methane to replace the bis(hydroxy propoxy phenyl) dimethyl methane of said example.

Example 11

A series of pigment dispersions were manufactured by grinding 180 parts of titanium dioxide of a non-chalking rutile grade in 100 parts of each of the materials prepared in Examples 1 to 7 as grinding vehicles.

An oil modified alkyd (identified as the capric alkyd) was prepared containing 36% of a fatty acid mixture containing capric acid to myristic acid in a 6:1 ratio. The alcoholic component of the alkyd was ethylene glycol and pentaerythritol in a 1:1 ratio, calculating 15% excess hydroxyl groups over acid groups in considering the polyhydric alcohol-phthalic anhydride components in the total alkyd.

A second oil modified alkyd was prepared from cocoanut oil, glycerine and phthalic anhydride of 28% oil length. This is referred to as the cocoanut alkyd.

An additional pigment base was prepared by grinding 450 parts of the same quality titanium dioxide as above in 300 parts of the capric alkyd described above and 50 parts of xylene. A series of enamels were thereafter prepared by stirring together 72.4 parts of the cocoanut oil alkyd, 16–½ parts of each of the pigment dispersions containing the vehicles described in the Examples 1 to 7 plus 53.1 parts in addition of the vehicle correspondingly used in the above component, 161 parts of the titanium capric alkyd dispersion and 40.9 parts of methyl isobutyl ketone. Thus, a series of eight enamels were prepared containing a blend of oil modified alkyds as representative of polymeric materials having active or labile hydrogen groups and containing each of the components prepared in Examples 1 through 7 as curing agents.

The enamels were divided into two aliquot portions, one of which, in each case, was reduced to spraying viscosity, each applied to several metal panels and baked 45 minutes at 250° F. One each of the panels was aged one month in a light-tight box. The unreduced paint was retained for examination after storage. Other prepared duplicate panels were subjected to other tests, the results of which are recorded below.

In that set of panels aged in the dark for one month it was found that those panels prepared from the materials described in Examples 1 to 6 had discolored only ½ as much upon age as the panel representing the composition of Example 7.

A second set of panels subjected to water immersion in distilled water at room temperature for eight hours and then a drying period of 16 hours were examined for pencil hardness and gloss. After six such cycles of wetting and drying the pencil hardness values and gloss were again determined. In the panel employing the cure agent of Example 7, an initial pencil hardness of B and a 60° gloss of 85° was observed. After six cycles the gloss of this panel fell to 47 and the pencil hardness fell to 5B. Using the agents described in the first six examples, initial pencil hardness was not lower than F and averaged between F and H with a 92 average 60° gloss. Very little difference was noted in studying these panels. After six cycles of alternate wetting and drying the hardness of the panels containing the first six compositions had fallen to a B pencil hardness and the gloss was not measurably deteriorated. After the wet and dry cycles had been completed, an additional 20 hour recovery period under normal room conditions was allowed. The pencil hardness was again determined on the test panels. The panel representing the cure agent of Example 7 containing the aliphatic polyol was considerably softer than any other test panels representing polymers containing the curing compositions from Examples 1 to 6. Still another representative set of panels were subjected to various baking schedules, including 1½ hours at 250° F. in one test. In a second, a bake 1½ hours at 250° F. and 1½ hours at 300° F. and a third test a bake of 1½ hours at 250° F. and 1½ hours at 300° F. In each baking test case, the enamels representative of Examples 1 to 6 attained ultimate hardness, did not soften back under the second bake, or discolor as much under the prolonged baking of the third test as did the enamels containing the curing composition of Example 7.

The retained enamels wet samples were examined after several months storage at room temperature. Very little change in viscosity in any of the samples was observed over this period of time and no progression in viscosity in any case recorded over any one month.

From the previous examples it is apparent that the compositions of the invention may be produced by reacting an ortho para diisocyanate substituted composition with a bis-hydroxy (alkoxy) phenyl alkane or a bis-dihydroxy diphenyl alkane, which has been condensed with up to eight moles of ethylene oxide or propylene oxide or mixtures thereof in either a symmetric or heteric manner. By symmetric is meant first condensing the selected number of mols of propylene oxide with the bis-phenol followed by treatment with ethylene oxide. By heteric is means condensation with ethylene oxide and propylene oxide in random arrangement.

The preferred manner of practice of the invention is to use a bis-phenol, illustratively p-p' dihydroxy diphenyl propane or p-p' dihydroxyl diphenyl methane, as the basic aromatic reactant. The diisocyanate is preferably 2,4-toluene diisocyanate. Substitutents other than alkyl, for example, halogen, in the one position do not interfere with the manufacture of compositions of this invention.

As will be obvious from the foregoing examples, if the aromatic diisocyanate is first condensed with the tertiary alkyl alcohol a slightly different structural relationship will result than if the aromatic diisocyanate is first reacted with the p-p' dihydroxy (alkoxy) diphenyl alkane. That this follows, is, of course, to be expected due to the differences in reactivity of the ortho and 2–4 positions of the isocyanate groups of the aromatic nucleus.

The useful alcohols are of tertiary nature and the alcohols preferred for the purposes of this invention include amyl and butyl alcohol. Alcohols of higher molecular weight are less preferred as it becomes increasingly difficult to activate the cross-linking catalyst under reasonable baking schedules, particularly as met in the use of polymeric materials having labile or hydrogen groups.

Having thus described the invention by illustration of the preferred examples in its practice and indicated the practical advantage of the compositions of the invention in the curing of polymeric materials containing an active hydrogen group in such manner that the practice of the invention is apparent to those skilled in the art, what we claim is:

1. A composition of matter having the general structure:

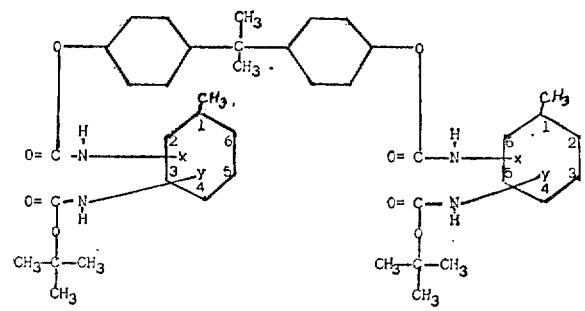

where $R_4$ and $R_5$ are tertiary aliphatic alcohol residues containing less than 7 carbon atoms in their hydrocarbon structure and $R_4$ can be identical to $R_5$; A is selected from the group consisting of halogen and lower alkyl;

where X is an alkylene group containing less than 4 carbon atoms;

where $R_3$ is an alkylene group of from two to three carbon atoms; $x$ and $y$ are ring substituent bond positions corresponding to the 2 position and 4 position of the phenyl nucleus;

and $z$ is a digit from zero to four.

2. The composition of claim 1, wherein X is a hydrocarbon group containing not more than three and not less than one carbon atom.

3. The composition of claim 1, wherein X is a methylene group.

4. The composition of claim 2 wherein $z$ is zero and $R_4$ and $R_5$ are tertiary butyl alcohol residues.

5. The composition of claim 2, wherein $z$ is zero, and $R_4$ and $R_5$ are tertiary amyl alcohol residues.

6. The composition of claim 1, wherein $z$ is zero, X is a propylene group and $R_4$ and $R_5$ are tertiary butyl alcohol residues.

7. A composition of matter of the structure:

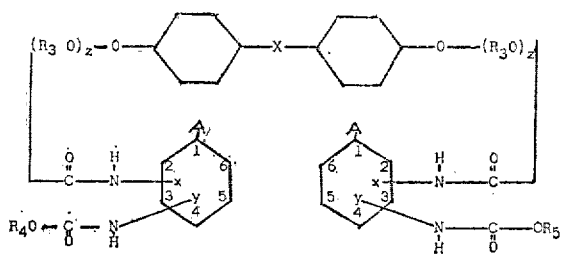

$x$ and $y$ are substituent positions in the phenyl nucleus representing the 2-position and the 4-position.

8. A method of curing labile hydrogen atom containing polymers by combining therewith a quantity of the composition of claim 1 such that one half of the urethane groups thereof are from 75% to about 125% of the stoichiometric equivalent of said reactive hydrogen atoms, and at a time subsequent to the addition, heating the admixture in a film to a temperature and for a time such that substantially all volatilization of alcohol from said film ceases.

9. The method as set out in claim 8 wherein the temperature is at least about 250° F. and the time is at least one half hour.

References Cited in the file of this patent
UNITED STATES PATENTS

| | | |
|---|---|---|
| 2,374,136 | Rothrock | Apr. 17, 1945 |
| 2,449,613 | Miller et al. | Sept. 21, 1948 |
| 2,683,728 | Mastin et al. | July 13, 1954 |
| 2,703,810 | Viard | Mar. 8, 1955 |
| 2,789,128 | Tursich | Apr. 16, 1957 |
| 2,797,232 | Bunge | June 25, 1957 |
| 2,801,231 | Caldwell | July 30, 1957 |
| 2,941,983 | Smeltz | June 21, 1960 |

FOREIGN PATENTS

| | | |
|---|---|---|
| 717,408 | Great Britain | Oct. 27, 1954 |

UNITED STATES PATENT OFFICE
CERTIFICATE OF CORRECTION

Patent No. 3,108,084                  October 22, 1963

Lynwood N. Whitehill et al.

It is hereby certified that error appears in the above numbered patent requiring correction and that the said Letters Patent should read as corrected below.

Column 8, lines 37 to 49, strike out the formula and insert the same after line 1, column 9; column 9, lines 2 to 12, strike out the formula and insert the same after line 35, column 8.

Signed and sealed this 19th day of May 1964.

(SEAL)
Attest:

ERNEST W. SWIDER                                      EDWARD J. BRENNER
Attesting Officer                                          Commissioner of Patents